United States Patent
Rowe et al.

(10) Patent No.: US 7,146,522 B1
(45) Date of Patent: Dec. 5, 2006

(54) SYSTEM AND METHOD FOR ALLOCATING SPARE DISKS IN NETWORKED STORAGE

(75) Inventors: Alan L. Rowe, San Jose, CA (US); Richard O. Larson, Cupertino, CA (US); Susan M. Coatney, Cupertino, CA (US); Joydeep sen Sarma, Redwood City, CA (US); Samuel M. Cramer, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 443 days.

(21) Appl. No.: 10/027,013

(22) Filed: Dec. 21, 2001

(51) Int. Cl.
*G06F 11/00* (2006.01)

(52) U.S. Cl. ................. 714/6; 714/7; 714/42; 711/158; 711/162; 369/53.17; 369/47.13

(58) Field of Classification Search ................. 714/5–8, 714/42, 710; 711/114, 133, 158, 162; 369/53.17, 369/47.14
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,787,460 A * | 7/1998 | Yashiro et al. | 711/114 |
| 5,790,782 A * | 8/1998 | Martinez et al. | 714/53 |
| 5,802,366 A | 9/1998 | Row et al. | |
| 5,812,761 A * | 9/1998 | Seki et al. | 714/54 |
| 5,819,292 A | 10/1998 | Hitz et al. | |
| 5,835,940 A * | 11/1998 | Yorimitsu et al. | 711/112 |
| 5,872,906 A * | 2/1999 | Morita et al. | 714/6 |
| 5,931,918 A | 8/1999 | Row et al. | |
| 5,941,972 A | 8/1999 | Hoese et al. | |
| 5,954,822 A * | 9/1999 | Yashiro et al. | 714/6 |
| 5,963,962 A | 10/1999 | Hitz et al. | |
| 6,038,570 A | 3/2000 | Hitz et al. | |
| 6,044,444 A * | 3/2000 | Ofek | 711/162 |
| 6,065,037 A | 5/2000 | Hitz et al. | |
| 6,317,844 B1 * | 11/2001 | Kleiman | 714/6 |
| 6,425,035 B1 | 7/2002 | Hoese et al. | |
| 6,513,097 B1 * | 1/2003 | Beardsley et al. | 711/113 |
| 6,760,862 B1 * | 7/2004 | Schreiber et al. | 714/15 |

OTHER PUBLICATIONS

American National Standards Institute, Inc.; American National Standard for Information Technology; Fibre Channel—Physical and Signaling Interface (FC-PH) ; Nov. 14, 1994.
American National Standards Institute, Inc.; American National Standard for Information Technology—Fibre Channel Arbitrated Loop (FC-AL-2) ; Dec. 8, 1999.

(Continued)

*Primary Examiner*—Robert Beausoliel
*Assistant Examiner*—Emerson Puente
(74) *Attorney, Agent, or Firm*—Cesari and McKenna, LLP

(57) ABSTRACT

A system and method for a file server to allocate spare disks in a network storage system. The method determines the available spare disks and first selects those disks that satisfy one or more required rules. The method sorts the spare disks by a set of ordered policies to determine a highest-ranked disk that is then selected as the spare to be utilized. If multiple disks are equally ranked, one of the equally ranked disks is randomly chosen to be the spare disk allocated.

11 Claims, 8 Drawing Sheets

OTHER PUBLICATIONS

SNIA Storage Networking Industry Association; Common Internet FIle System (CIFS) , Version: CIFS-Spec. 0.9. Work Group in Progress.

Fibre Channel Generic Services—3 (FC-GS-3) , Revision 6.0; NCITS Working Draft Proposed American National Standard for Information Technology; Nov. 24, 1999.

Draft Proposed American National Standard for Information Systems—SCSI-3 Primary Commands; Mar. 28, 1997.

New Identifier Formats Based on IEEE Registration; http://standards.ieee.org/regauth/oui/tutorials/fibreformat.html; Accessed on Aug. 6, 2001.

* cited by examiner

SYSTEM AND METHOD FOR ALLOCATING SPARE DISKS IN NETWORKED STORAGE

RELATED APPLICATIONS

This application is related to the following United States patent applications:

Ser. No. 10/027,020 filed on Dec. 21, 2001, entitled SYSTEM AND METHOD FOE TRANSFERRING VOLUME OWNERSHIP IN NETWORKED STORAGE, by Susan M. Coatney et al.

Ser. No. 10/027,457 filed on Dec. 21, 2001, now Published as U.S. Patent Application No. 2003/0120743 A1 on Jun. 26, 2003 entitled SYSTEM AND METHOD OF IMPLEMENTING DISK OWNERSHIP IN NETWORKED STORAGE, by Susan M. Coatney et al.

Ser. No. 10/027,330 filed on Dec. 20, 2001, entitled SYSTEM AND METHOD FOR STORING STORAGE OPERATING SYSTEM DATA IN SWITCH PORTS, by Susan M. Coatney et al.

FIELD OF THE INVENTION

The present invention relates to networked storage systems, and more particularly to allocating spare disks in networked storage systems.

BACKGROUND INFORMATION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, conversely, may be implemented as a specially formatted file in which information about other files and directories are stored.

A filer may be further configured to operate according to a client/server model of information delivery to thereby allow many clients to access files stored on a server. In this model, the client may comprise an application, such as a database application, executing on a computer that connects to the filer over a computer network. This computer network could be a point to point link, a shared local area network (LAN), a wide area network (WAN) or a virtual private network (VPN) implemented over a public network such as the Internet. Each client may request the services of the file system on the filer by issuing file system protocol messages (typically in the form of packets) to the filer over the network.

The disk storage typically implemented has one or more storage "volumes" comprised of a cluster of physical storage disks, defining an overall logical arrangement of storage space. Currently available filer implementations can serve a large number of is discrete volumes (150 or more, for example). Each volume is generally associated with its own file system. The disks within a volume/file system are typically organized as one or more groups of Redundant Array of Independent (or Inexpensive) Disks (RAID). RAID implementations enhance the reliability and integrity of data storage through the redundant writing of data stripes across a given number of physical disks in the RAID group, and the appropriate caching of parity information with respect to the striped data. In the example of a known file system and process, a RAID 4 implementation is advantageously employed. This implementation specifically entails the striping of data across a group of disks, and separate parity caching within a selected disk of the RAID 4 group.

Each filer "owns" the disks that comprise the volumes that the filer services. This ownership means that the filer is responsible for servicing the data contained on the disks. If the disks are connected to a switching network, for example, a Fibre Channel switch, all of the filers connected to the switch are typically able to see, and read from, all of the disks connected to the switching network. However, only the filer that owns the disks can write to the disks. In effect, there is a "hard" partition between disks that are owned by separate filers that prevents a non-owner from writing to a disk.

This ownership information is stored in two locations. In the example of a known file system, each disk has a predetermined sector named sector S that contains the definitive ownership information. In one embodiment, sector S is sector zero of the disk. The second source of this ownership information is through the use of Small Computer System Interface (SCSI) level 3 reservations. These SCSI-3 reservations are described in SCSI Primary Commands-3, by T10 of the National Committee for Information Technology Standards, which is incorporated fully herein by reference. This method for implementing disk ownership is described in commonly owned U.S. patent application Ser. No. 10/027,457 by Sue Coatney, et al., which is hereby incorporated by reference.

The combination of sector S and SCSI-3 reservation ownership information is often shown in the following format <SECTORS, SCSI>, where SECTORS denotes the ownership information stored in sector S and SCSI is the current holder of the SCSI-3 reservation on that disk. Thus, as an example, if sector S and the SCSI-3 reservation of a disk both show that the disk is owned by a filer, arbitrarily termed "Green," that disks' ownership information could be denoted <G,G>, where "G" denotes green. If one of the ownership attributes shows that the disk is unowned, a U is (arbitrarily) used, i.e. <G,U>for a disk whose SCSI-3 reservations do not show any ownership.

Many networked storage systems include a plurality of disks that are not currently being utilized by any filer in a volume. For example, if these non-utilized disks are designated as "spare" disks that can be allocated by any filer in the event of a disk failure in a volume, a new volume is to be created, or an existing volume is to be expanded. In prior storage system implementations, each filer had its own group of spare disks attached directly to each filer. This resulted in a noted disadvantage in that spares were only available on a filer by filer basis. If a disk failed, the filer would choose a spare disk available to the filer to replace the failed disk. This case would arise where a particular filer would run out of spare disks, but other filers in the system still have excess spare disks.

Accordingly, it is an object of the present invention to provide a system and method for allocating spare disks in a network storage system such that multiple filers can access spares across various switches and switching networks. The system and method should work to select the "best" spare disk according one or more rules and a set of policies that can be prioritized by desirability according to the user.

SUMMARY OF THE INVENTION

This invention overcomes the disadvantages of the prior art by providing a system and method for allocating spare disks in a networked storage system such that each filer in a networked storage system can access and utilize any spare disk attached to the networked system. In the event of a disk failure, a storage operating system will utilize the novel method of choosing the "best" spare disk within the storage system. The spare disks are selected based upon one or more rules and a plurality of policies.

The spare disks that satisfy the one or more rules are first selected from the entire spare disk pool. Then these spare disks are sorted and ranked according to an ordered set of policies. The policies can be user-ordered to satisfy various desires of the user. Once the disks are sorted, the highest-ranked spare disk is selected as the disk to allocate to replace the failed or malfunctioning disk. In the event that multiple disks are evenly ranked after all of the sorting has occurred, one of the highest-ranked disks is randomly selected to be allocated.

The system and method may also be utilized by a process or program running within a storage operating system to analyze a volume on a file server to determine if the disks which comprise the volume are optimally arranged. In an alternative embodiment, the disks are then rearranged into the optimal configuration.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
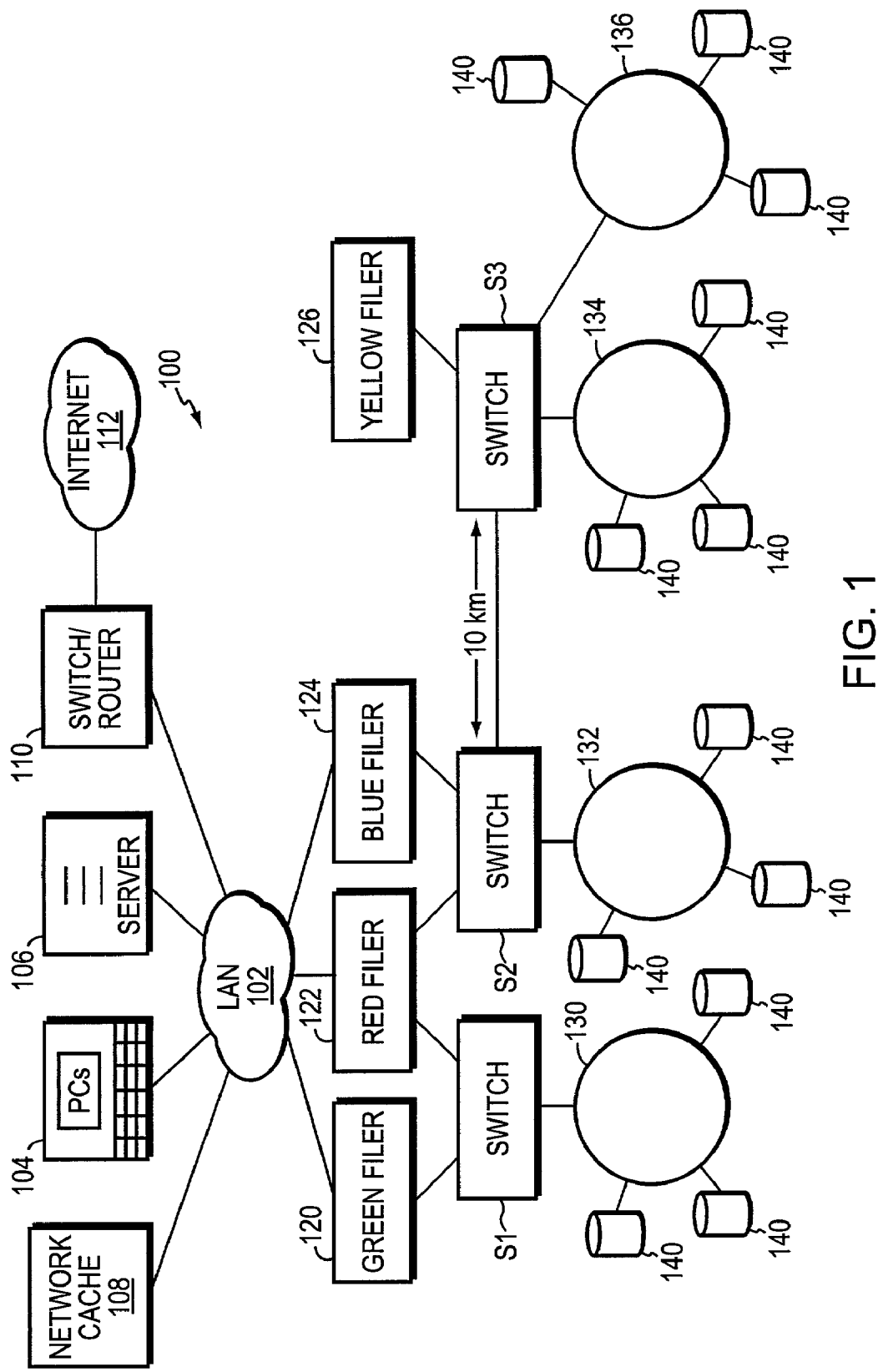
FIG. 1 is a schematic block diagram of a network environment including various network devices including exemplary file servers, switches, and associated volumes.

FIG. 1 is a schematic block diagram of an exemplary network environment 100 in which the principles of the present invention are implemented. The network 100 is based around a local area network (LAN) 102 interconnection. However, a wide area network (WAN) virtual private network (VPN) utilizing communication links over the Internet, for example, or a combination of LAN, WAN and VPN implementations can be established. For the purposes of this description, the term LAN should be taken broadly to include any acceptable networking architecture. The LAN interconnects various clients based upon personal computers 104, servers 106 and a network cache 108. Also interconnected to the LAN may be switch/router 110 which provides a gateway to the well-known Internet 112 thereby enabling various network devices to transmit and receive Internet based information, including email, web content, and the like.

Exemplary filers, including green, red, blue and yellow filers 120, 122, 124 and 126 respectively, are connected to the LAN 102. These filers, described further below, are file servers configured to control storage of, and access to, data in a set of interconnected storage volumes. As described further below, each volume is typically organized to include one or more RAID groups of physical storage disks for increased data storage integrity and reliability. Each of the devices attach to the LAN include an appropriate conventional network interface arrangement (not shown) for communicating over the LAN using desired communication protocols such as the well-known Transport Control Protocol/Internet Protocol (TCP/IP), User Datagram Protocol (UDP), Hypertext Transfer Protocol (HTTP), or Simple Network Management Protocol (SNMP).

The filers are also connected to a plurality of switches S1, S2, S3. The switches are preferably fibre channel switches each connected to one or more fibre channel loops 130, 132, 134 and 136. The physical disks 140 that comprise the volume served by the filers are attached to the loops. An exemplary switch S3 is shown as being 10 kilometers from switch S2. This distance should not be taken as absolute, but rather as an illustrative long distance to signify that switches may be located in locations remote from each other.

B. File Servers

Figure 2:
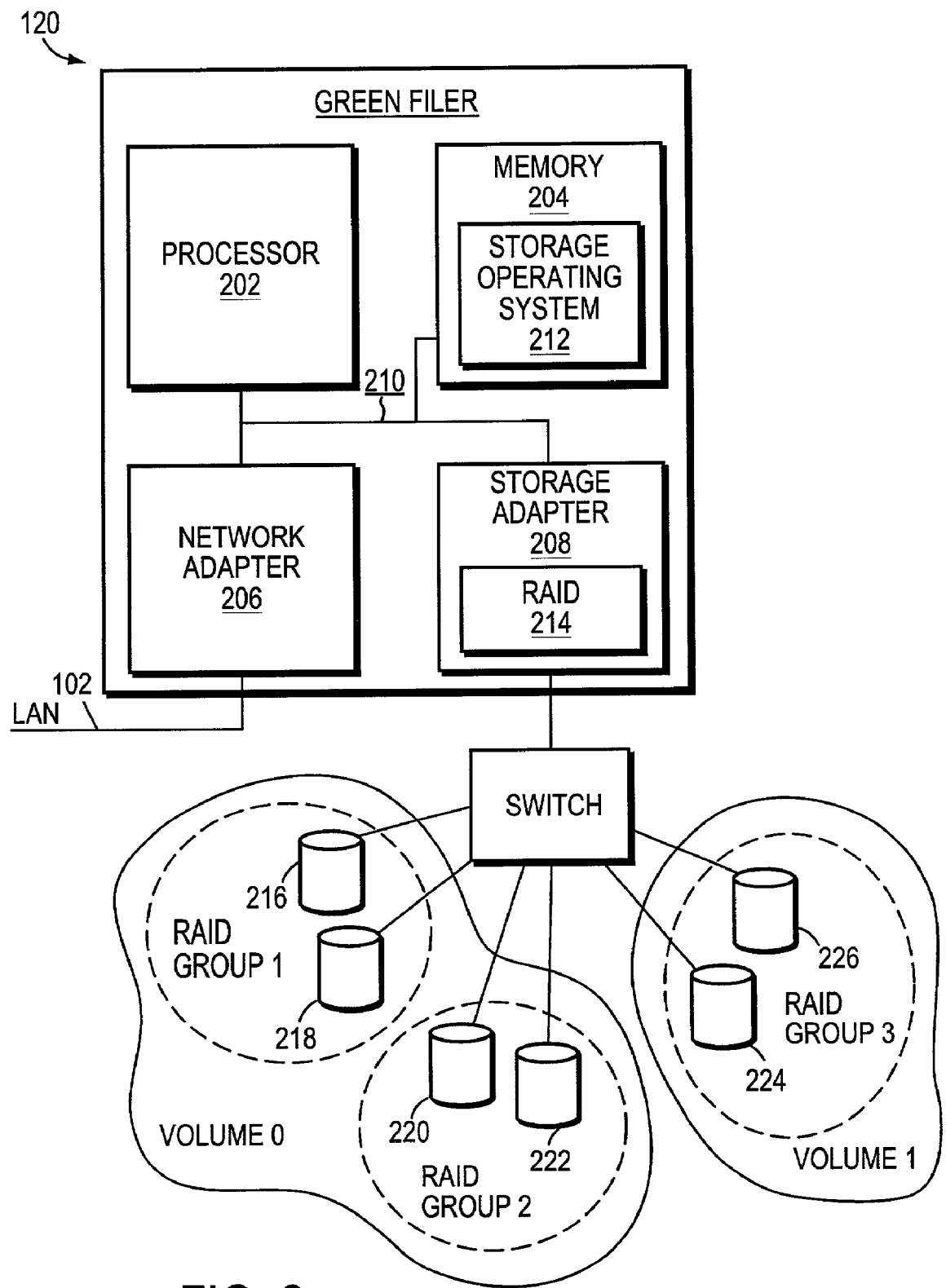
FIG. 2 is a more-detailed schematic block diagram of an exemplary storage system environment in accordance with FIG. 1.

FIG. 2 is a more-detailed schematic block diagram of an exemplary file server 120 that is advantageously used with the present invention. Other file servers can have similar construction. By way of background, a file server, embodied as a filer, is a special-purpose computer that provides file service relating to the organization of information on storage devices, such as disks. However, it will be understood by skilled in the art that the inventive concepts described herein may apply to any type of special-purpose computer or general-purpose computer, including a stand-alone computer. The filer comprises a processor 202, a memory 204, a network adapter 206 and a storage adapter 208 and interconnected by a system bus 210. It may also include a non-volatile random access memory (NVRAM) (not shown) for storing requests in event of a service disruption. The filer also includes, within memory, a storage operating system 212 that implements the file system to logically organize the information as a hierarchical structure of directories and files on the disks.

In the illustrative embodiment, the memory 204 may have storage locations that are addressable by the processor and adapters for storing software program code where data structures associated with the present invention. The processor and adapters, may in turn, comprise processing elements and/or logic circuitry configured to execute the software code and manipulate the data structures. The storage operating system 212, portions of which are typically resident in memory and executed by the processing elements, functionally organize a filer by invoking storage operations in support of a file service implemented by the filer. It will be apparent to those skilled in the art that other processing and memory implementations, including various computer-readable media, may be used for storing and executing program instructions pertaining to the inventive technique described herein.

The network adapter 206 comprises the mechanical, electrical and signaling circuitry needed to connect the filer to a client over the computer network, which as described generally above, can comprise a point-to-point connection or a shared medium such as a LAN. A client can be a general-purpose computer configured to execute applications including file system protocols, such as the Common Internet File System (CIFS) protocol. Moreover, the client can interact with the filer in accordance with the client/server model of information delivery. The storage adapter cooperates with the storage operating system 212 executing in the filer to access information requested by the client. The information may be stored in a number of storage volumes (Volume 0 and Volume 1), each constructed from an array of physical disks that are organized as RAID groups (RAID GROUPs 1, 2 and 3). The RAID groups include independent physical disks including those storing a striped data and those storing separate parity data (RAID 4). In accordance with a preferred embodiment RAID 4 is used. However, other configurations (e.g., RAID 5) are also contemplated.

The storage adapter 208 includes input/output (I/O) interface circuitry that couples to the disks over an I/O interconnect arrangement such as a conventional highspeed/high-performance fibre channel serial link topology. The information is retrieved by the storage adapter, and if necessary, processed by the processor (or the adapter itself) prior to being forwarded over the system bus to the network adapter, where the information is formatted into a packet and returned to the client.

To facilitate access to the disks, the storage operating system 212 implements a file system that logically organizes the information as a hierarchical structure of directories in files on the disks. Each on-disk file may be implemented as a set of disk blocks configured to store information such as text, whereas the directory may be implemented as a specially formatted file in which other files and directories are stored. In the illustrative embodiment described herein, the storage operating system associated with each volume is preferably the NetApp® Data ONTAP operating system available from Network Appliance Inc. of Sunnyvale, Calif. that implements a Write Anywhere File Layout (WAFL) file system. The preferred operating system for the exemplary filer is now described briefly. However, it is expressly contemplated that the principles of this invention can be implemented using a variety of alternate operating system architectures.

C. Storage Operating System

Figure 3:
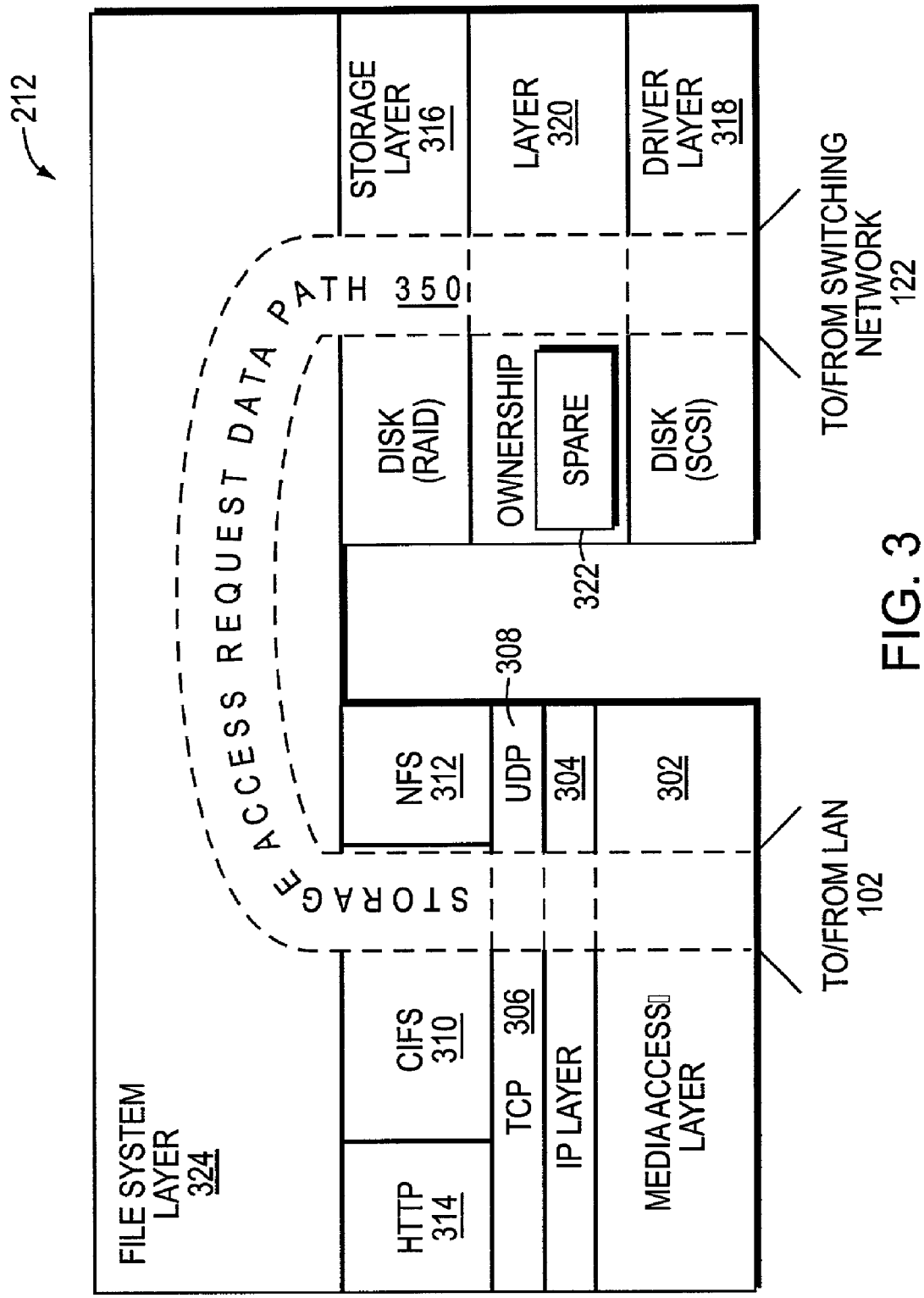
FIG. 3 is a schematic block diagram of a storage operating system for use with the exemplary file server of FIG. 2 according to an embodiment of this invention.

As shown in FIG. 3, the storage operating system 212 comprises a series of software layers including a media access layer 302 of network drivers (e.g., an Ethernet driver). The storage operating system further includes network protocol layers such as the IP layer 304 and its TCP layer 306 and a UDP layer 308. A file system protocol layer provides multi-protocol data access and, to that end, includes support from the CIFS protocol 310, the Network File System (NFS) protocol 312 and the HTTP protocol 314.

In addition, the storage operating system 212 includes a disk storage layer 316 that implements a disk storage protocol such as a RAID protocol, and a disk driver layer 318 that implements a disk access protocol such as e.g., a Small Computer System Interface (SCSI) protocol. Included within the disk storage layer 316 is a disk ownership layer 320, which manages the ownership of the disks to their related volumes.

As used herein, the term "storage operating system" generally refers to the computer-executable code operable on a storage system that implements file system semantics (such as the above-referenced WAFL) and manages data access. In this sense, ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Bridging the disk software layers with the network and file system protocol layers is a file system layer 324 of the storage operating system. Generally, the file system layer 324 implements the file system having an on-disk file format representation that is block-based. The file system generates operations to load/retrieve the requested data of volumes if it is not resident "in-core", i.e., in the filer's memory. If the information is not in memory, the file system layer indexes into the inode file using the inode number to access an appropriate entry and retrieve a logical block number. The file system layer then passes the logical volume block number to the disk storage/RAID layer, which maps out logical number to a disk block number and sends the later to an appropriate driver of a disk driver layer. The disk driver accesses the disk block number from volumes and loads the requested data into memory for processing by the filer. Upon completion of the request, the filer and operating system return a reply, e.g., a conventional acknowledgement packet defined by the CIFS specification, to the client over the network. It should be noted that the software "path" 350 through the storage operating system layers described above, needed to perform data storage access for the client received the filer, may ultimately be implemented in hardware, software or a combination of hardware and software.

Within the ownership layer 320 is a spare disk layer 322. Notably, the spare disk layer 322 operates to efficiently allocate spare disks accessible by the filer to replace a failed disk according to one or more rules and a set of policies.

D. Spare Disk Allocation

Figure 4:
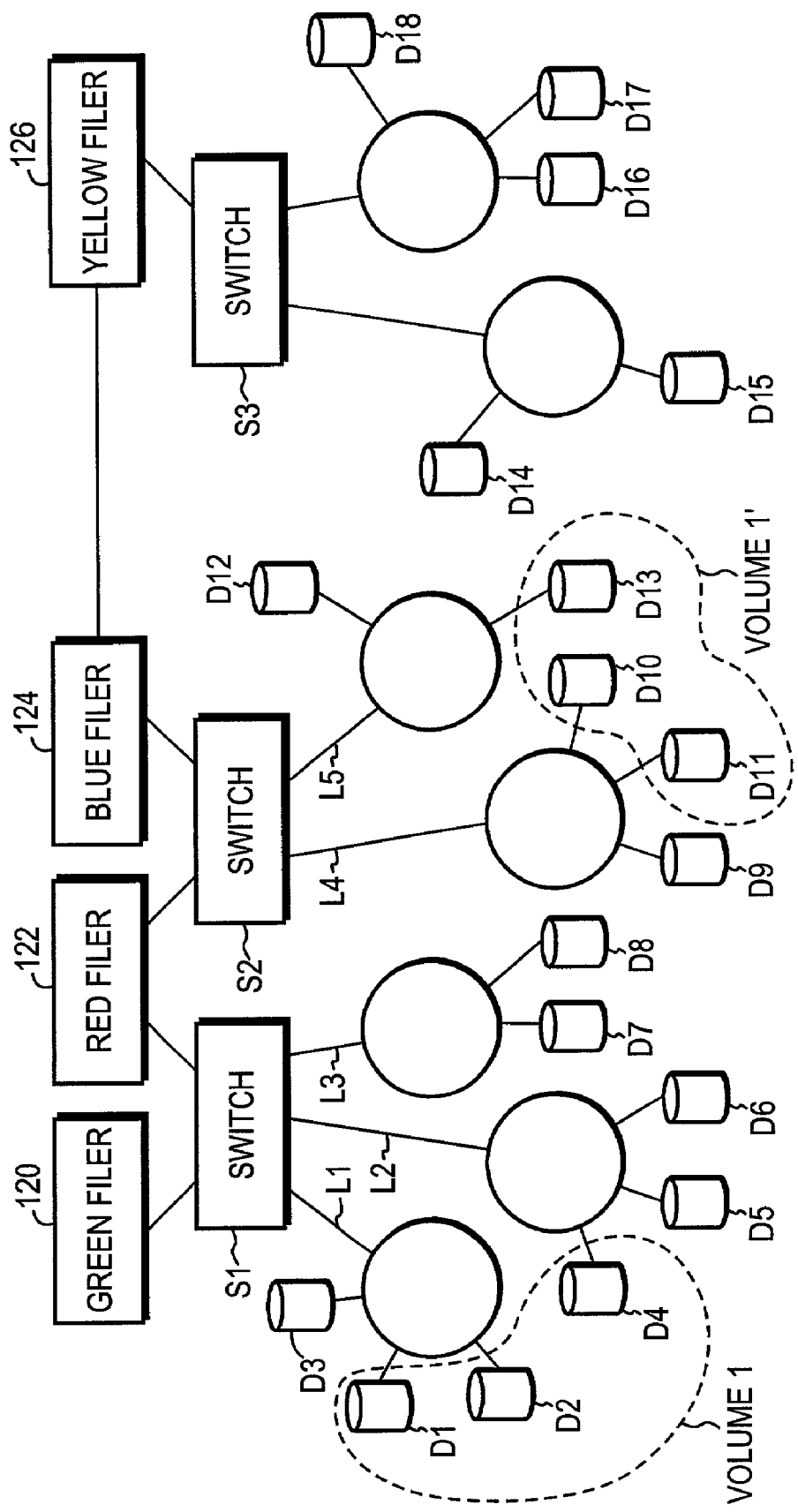
FIG. 4 is a schematic block diagram of a network environment including exemplary filers and disks connected to various switches.

FIG. 4 is a schematic block diagram showing an illustrative network including filers, switches, fibre channel loops and disks attached thereto. In this exemplary configuration there are a green, red, blue and yellow filers 120, 122, 124, and 126 respectively. Additionally, there are three switches S1, S2 and S3. Switch S1 has fibre channel loops L1, L2 and L3 connected thereto. Switch S2 is connected to fibre channel loops L4 and L5. Similarly, switch S3 connects to fibre channel loops L6 and L7. In this illustrative network switch S3 is shown as being 10 kilometers away from switch S2. It should be noted that this distance is illustrative and should be taken to represent any length of distance. Specifically, it should be taken to represent that the switches may be located in remote locations from each other. It is expressly contemplated that other configurations are possible, including having all switches located in one physical location.

Volume 1, comprised of three disks D1, D2 and D4, all of which are connected to fibre channel loops connected to switch one S1. Volume 1', a mirror of Volume 1, comprises disks D10, D11 and D13, all of which are connected to fibre channel loops connecting to switch two S2.

If in the event of a disk failure, for example, the failure of disk D1, the spare allocation layer of the disk ownership layer 320 allocates one of the unowned and spare disks attached to the system. This allocation will occur to permit the storage operating system to then reconstruct the data onto the spare disk using the processes defined within the RAID standards. These disks are selected according to a novel procedure employing one or more rules and a set of policies. In an illustrative embodiment, all of the spare disks attached to the network storage system are a common resource. Any filer may allocate any spare disk.

The process for selecting spare disks should not override the significant desire to reconstruct the volume containing the failed disk as soon as possible, thereby avoiding the possibility of another disk failure and causing an undesirable double disk failure. Thus, if there are no spare disks available which match the desired constraints, the spare allocation layer will use any available spare, even one that violates one of the rules. The allocation layer, if it uses a spare disk that does not match the desired constraints, alerts the administrator to enable the administrator to take action to provide a more suitable disk at a later time.

In an exemplary embodiment, one or more rules for selecting spare disks are defined. The rules are preferably hard-coded and not user adjustable. In this embodiment, the rules are designed for ensuring data integrity by providing redundancies within the data transfer path. Conversely, the policies are not hard-coded and can be user ordered so to configure the spare selection procedure according to the user's desires.

In an illustrative embodiment, there is a rule that is designed to work with volumes that are mirrored, for example Volume 1 and Volume 1'. Mirroring is intended to deal with catastrophic failures of disk subsystems. The two halves of the mirror are required to be within different fault domains, i.e., they do not share disks, shelves, ports, switches or adapters, and can therefore be tolerant of a failure of any or all of these. Thus, if disk one D1 fails, the rule would not permit any of the disks connected to switch S2, where the disks for Volume 1' are located, from being utilized The policies can be user prioritize on a per volume basis. In an embodiment, the user specifies options via a command line using an exemplary command:

vol options vol1 SPAREPOLICY policy1, policy2, . . .

This command would set policy1 as the first policy to filter disks based upon, with policy2 being the second. The policies can be ordered in any way. If the user does not order all of the policies, the process only utilizes those that have been ordered. Alternately, the non-user ordered policies are utilized after the user-ordered policies.

It should be noted that other user interfaces are expressly contemplated, including a graphical user interface that permits the user to order the policies.

In an illustrative embodiment, the policies that can be ordered include proximity, size, and speed performance. It should be noted that additional policies could be utilized in accordance with the teaching of the present invention.

The proximity policy deals with having the spare disk be physically closer to other disks in the volume. Proximity is defined by a four-level hierarchy:

1. The shelf on which the failed disk is located;

2. Another shelf on the same loop on which the failed disk is located;

3. A loop/shelf/disk on the switch which the disk is located; and

4. A disk in the same location.

A "location" is a set of switches that the user specifies as being in the same physical place. For example, switches S1 and S2 could be identified as being in the same location. The third switch S3 could be defined as being in a different location, as it is illustratively shown to be 10 kilometers away from switches S1 and S2.

The size policy allows the user to control the size of any chosen spare disk. The size policy chooses a spare disk which is large enough to replace the dead disk, but no larger. For example, if the disk that fails is 9 gigabytes (GB) in storage size, and the spare disks attach to the filer include ones of 15 GB, 30 GB and 50 GB in storage size, the size policy would prefer the 15 GB disk. This size policy is to help eliminate wasted space on disks. For example, if a 10 GB disk is used to replace a 5 GB disk, the file server would not typically utilize the "extra" 5 GB. Thus, it is often desirable to minimize this unutilized space.

The speed policy allows a user to select between disks having different speeds (e.g., spin speeds and/or data read/write speeds). Thus, for example if a volume is composed of a number of disks having a high speed, and two otherwise equal disks are available, one having a high speed and the other a low speed the speed policy would prefer the higher speed disk. Similarly, if a volume is composed of lower speed disks the speed policy would prefer lower speed disks over faster speed disks to avoid wasting the highspeed disk.

It is expressly contemplated that other policies can be utilized in accordance with the teachings of the present invention.

In an illustrative embodiment, the default ordering of the policies is proximity, size, speed, and other policies.

Figure 5:
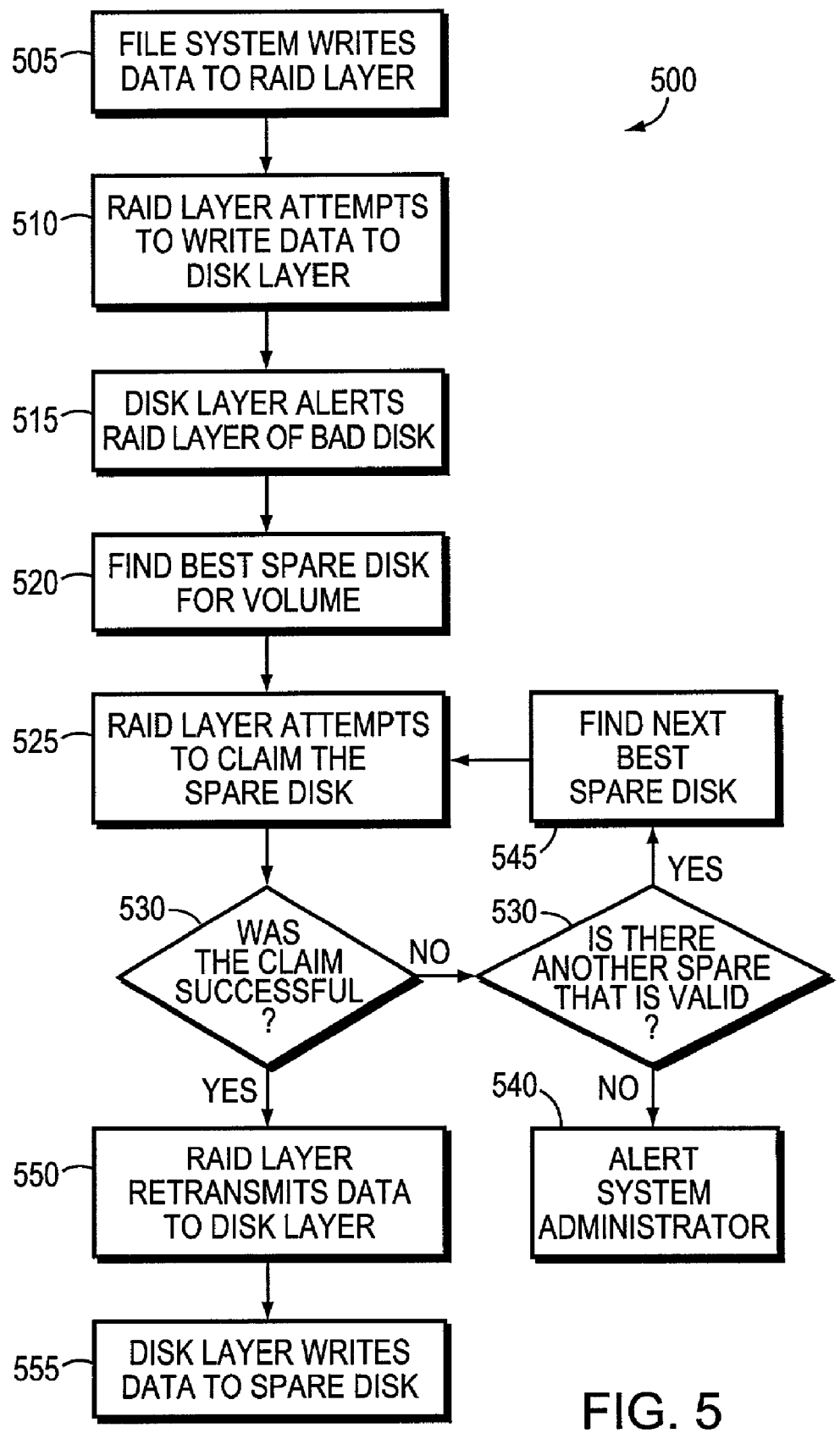
FIG. 5 is a flowchart detailing the procedure for allocating a best spare for a volume.

FIG. 5 is a flow chart detailing steps of a procedure 500 surrounding the allocation of a best spare for a volume. In step 505 the file system layer writes a set of data to the RAID layer. Similarly, in step 510 the RAID layer writes the data to the disk layer. If the disk layer detects a failed disk, it will alert the RAID layer of the failed disk in accordance with step 515. The ownership layer 320 (FIG. 3), in conjunction with the spare allocation layer 322, then attempts to find the best spare disk for the volume in step 520. Once the best spare is found, the RAID layer attempts to claim the spare disk in step 525. The RAID layer then determines if the claim was successful in step 530. If the filer was unable to claim the spare disk a check is made to determine whether there is another spare that is validly available in step 535. If there is no spare that is valid for the volume, the administrator will be alerted in accordance with step 540. If there is another spare that is valid for the volume, the ownership layer 320, in conjunction with the spare allocation layer, 322 finds the next best spare in step 545. Once the next best spare is found, the RAID layer attempts to claim the spare as in step 525. Once the claim is successful, the RAID layer retransmits the write information to the disk layer in step 550. And finally, the disk layer in step 555 writes the data to the best spare available.

Figure 6:
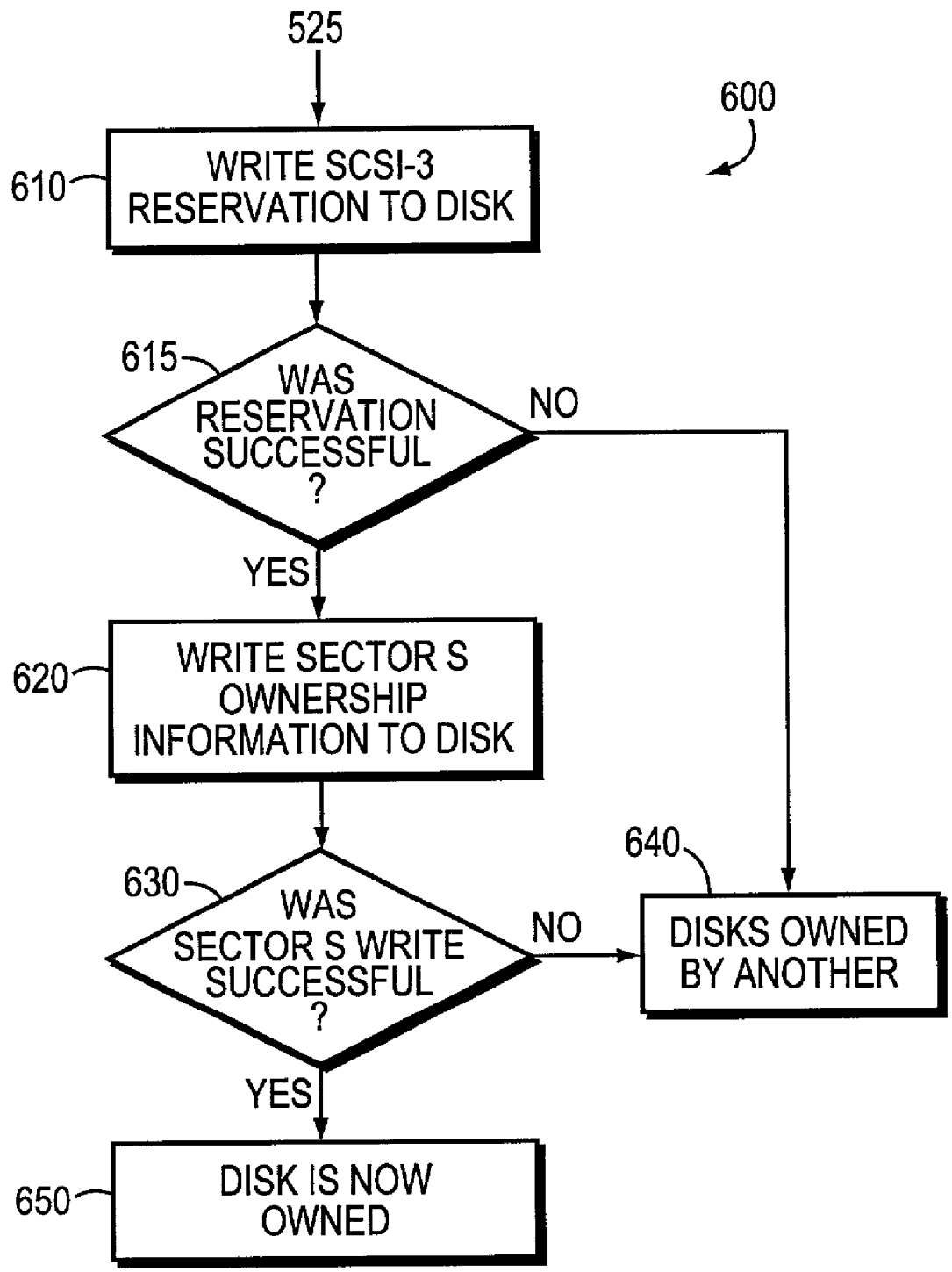
FIG. 6 is a flow chart detailing the procedure for finding and claiming the best spare disk in accordance with an embodiment of this invention.

FIG. 6 is a flow chart more-particularly detailing the steps of a procedure 600 involved in claiming a spare disk in accordance with step 525 of FIG. 5. In step 610 the SCSI-3 reservations are written to the disk to be claimed. This SCSI-3 reservation identifies the particular filer that serves the volume as the new owner of the disk to be claimed. A check is done (step 615) to determine if the reservation was successfully set. If the reservation was not successful, the disk is owned by another file server and the disk is not a valid spare (step 640). This can occur when two or more file servers are attempting to claim ownership of the same disk. If the reservation was successful, then, in step 620, the filer then writes the sector S ownership information to the disk. Then, in accordance with step 630, the filer verifies whether the sector S ownership information was successfully written to the disk. If the sector S write was unsuccessful, the disk is owned by another, and is not a valid spare as in step 640. This can occur when multiple filers are attempting to claim ownership of a disk. According to an illustrative embodiment, the first filer to write sector S ownership information owns the disk. If the sector S ownership information was successfully written, the disk is now owned by that particular filer as in step 650.

Figure 7:
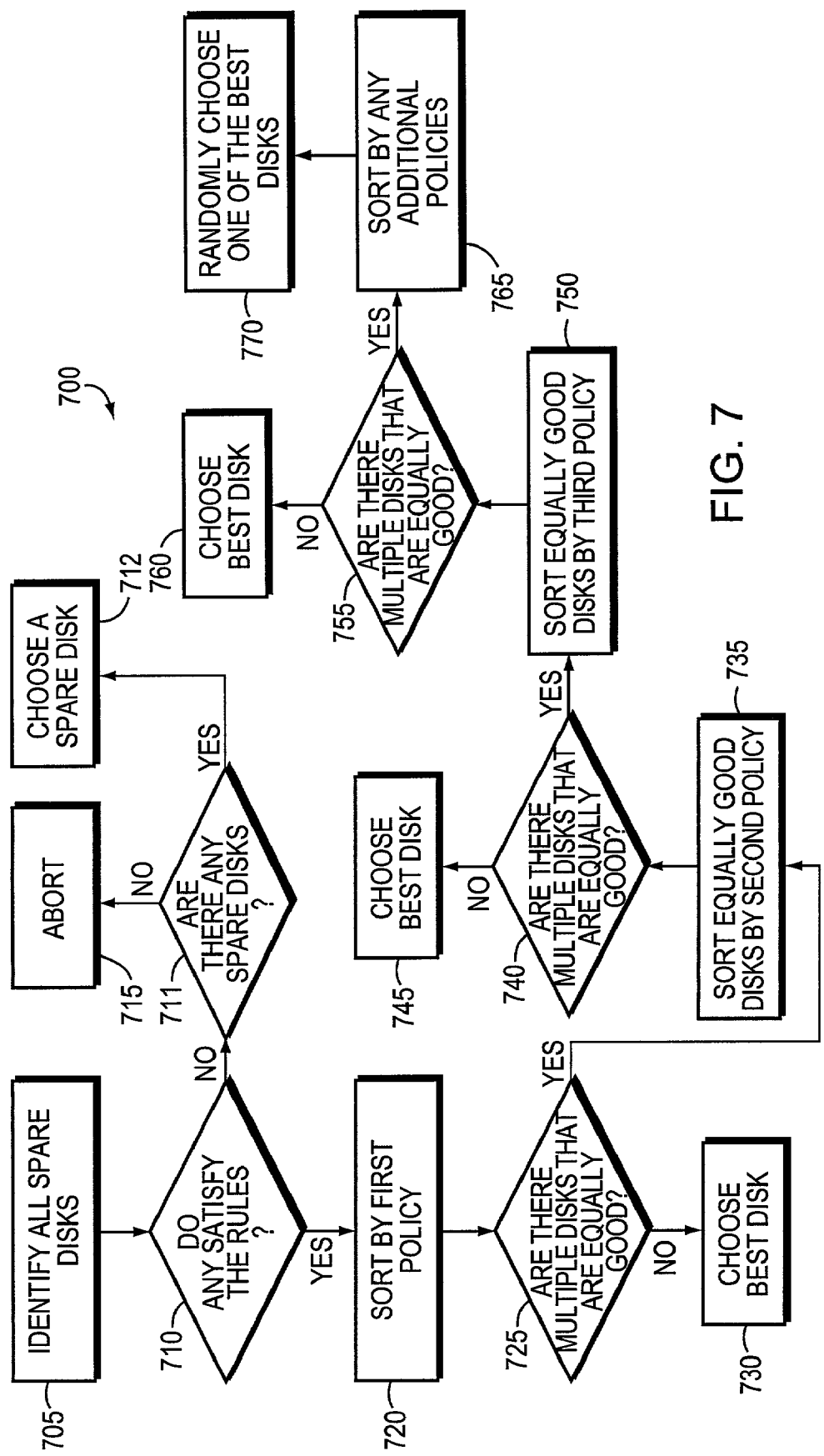
FIG. 7 is a flow chart detailing the procedure for identifying the best spare disk for a volume.

FIG. 7 is a flow chart detailing the steps of a procedure 700 involved in identifying the best spare for a volume, given the administrator's preference of policies for that particular volume. In step 705, all spare disks connected to the storage system are identified. This identification can be accomplished by accessing the disk ownership table created by the ownership layer of the storage operating system. Next, in step 710 the spare disks are checked against the set of rules. If there are no spare disks that satisfy the rules, the process will then determine (step 711) if there are any spares available. If there are no spares available, the process will abort in step 715. If there is a spare disk available, the process will select that spare disk (step 712) even if the disk violates the rules and policies.

If there are disks that satisfy the rules, the spare disks are sorted by the first ranked policy in step 720. This first ranked policy is either the default first policy (i.e. proximity), or if the user has modified the ordering, the user-selected first policy. Next, in step 725, the spare disks are checked to determine if there are multiple disks that are equally good, i.e. there is more than one disk that is equally ranked after sorting. If there are no equally ranked disks, the spare allocation layer 322 chooses the best disk (step 730). Otherwise, the equally ranked disks are sorted by the second policy in step 735. This second policy default is size in one embodiment if the user has not modified the ordering of the policies. Again, in step 740 a determination is made if there are still equally ranked disks. If there is only one "best" disk, it is selected in step 745. Otherwise, the equally ranked disks are sorted by the third ranked policy in step 750. In one embodiment, this third policy defaults to speed unless the user has modified the ordering of the policies.

The disks are then checked to determine if there are equally ranked disks (step 755). If there are no equally ranked disks after the sort, the best disk is selected in step 760. If there are still equally ranked disks, the disks are sorted by any additional polices in step 765. This sort is equivalent to the previous three sorts. If, after the disks have been sorted by all of the policies, there are still disks that are equally ranked as the best disk, one of the equally ranked disks is randomly selected to be allocated in step 770.

In a preferred embodiment, a background process within the ownership layer 320 runs a periodic check of all volumes served by that particular filer to determine if the disks associated with a volume are optimal. If the background process finds non-optimal arrangements, notification is sent to the system administrator. A further extension of this background process alerts the system administrator of the most-optimal configuration of the disks available. It should be noted that it is expressly contemplated according to an alternate embodiment that this background process automatically rearranges the disks comprising the volumes to produce the most-optimal configuration in accordance with the rules and policies. Optimal is used herein to mean that the disks comprising the volume are configured in such a way to satisfy the policies.

Figure 8:
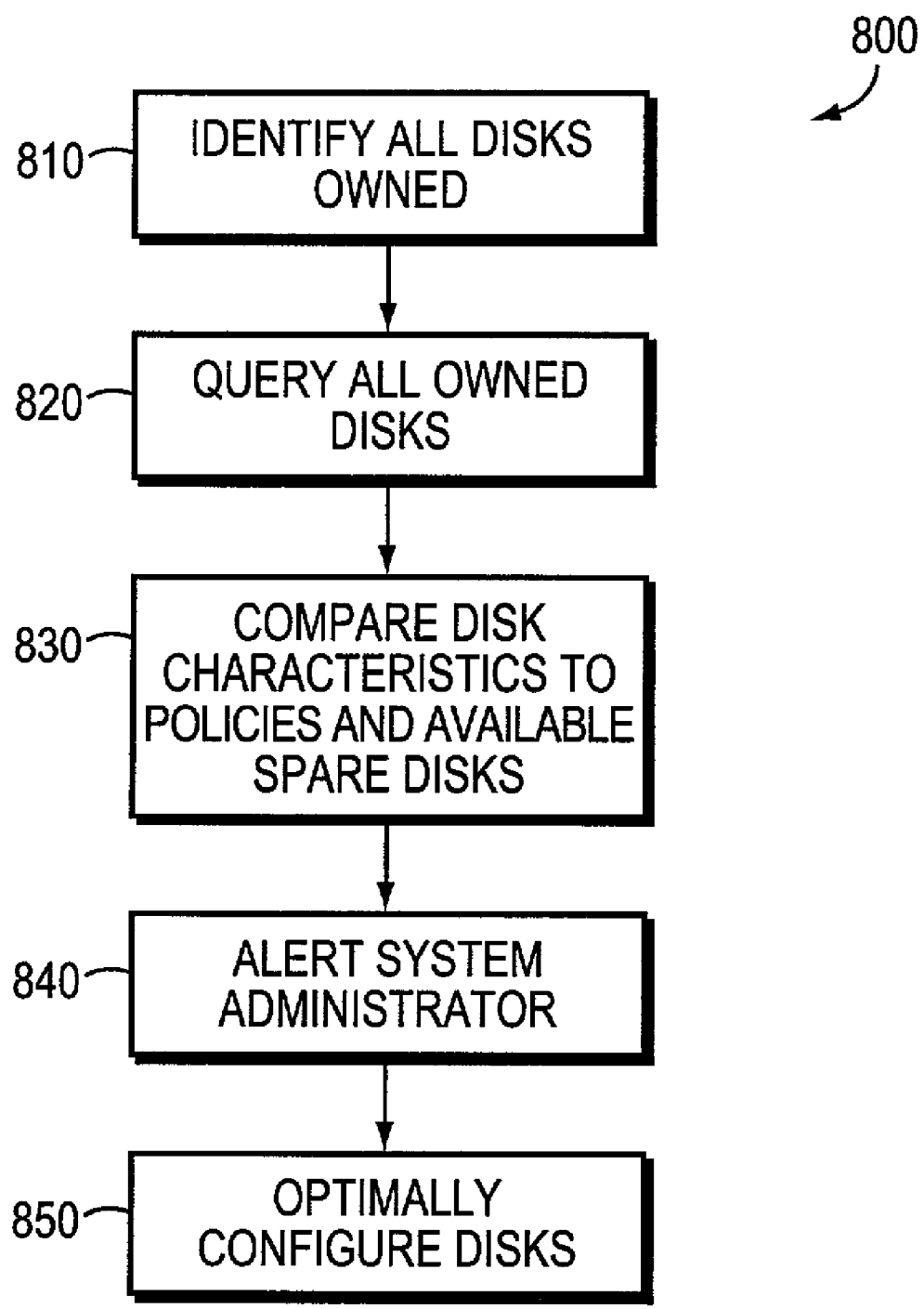
FIG. 8 is a flow chart detailing a procedure for optimally configuring disks in accordance with an embodiment of this invention.

FIG. 8 is a flow chart detailing the steps of a procedure 800 executed by this background process. In step 810 the process identifies all of the disks owned by that particular volume. This ownership information is obtained from a disk table within the ownership layer 320. In step 820 the process then queries all of the disks to obtain additional information such as their speed or size. Then, in step 830 the process compares the current disk arrangement with the policies and rules to determine if the most optimal arrangement is currently configured. In step 840 the system administrator is alerted if the most optimally configured arrangement is not presently used. As an optional step (step 850) the process automatically arranges the disks into the most optimal arrangement. Additionally, it will notify the system administrator that no spare disk exists that match is the preferences.

The foregoing has been a detailed description of the invention. Various modifications and additions can be made without departing from the spirit and scope of this invention. Furthermore, it is expressly contemplated but the process is shown and described according to this invention can be implemented as a software, consisting of a computer-readable medium including program instructions executing on a computer, as hardware or firmware using state machines and the a like, or as a combination of hardware, software and firmware. Additionally, it is expressly contemplated that additional rules and/or policies may be implemented in accordance with this invention. Accordingly, this description is meant to be taken only by way of example and not to otherwise limit the scope of this invention.

What is claimed is:

1. A method for allocating a spare disk to replace a failed disk in a network storage system, comprising:

maintaining a plurality of volumes in the network storage system, each volume associated with a set of disk storage units;

maintaining a plurality of spare disks in the network storage system;

attempting to determine the best spare disk by selecting those disks from the plurality of spare disks which meet at least one rule;

replacing the failed disk with the best spare disk;

in the event that no spare disk meets the at least one rule, selecting a spare disk which violates the at least one rule as a selected disk; and notifying an administrator that the selected spare disk violates the rule.

2. A network storage system, comprising:

means for maintaining a plurality of volumes in the network storage system, each volume associated with a set of disk storage units;

means for maintaining a plurality of spare disks in the network storage system;

means for attempting to determine a best spare disk by selecting those disks from the plurality of spare disks which meet at least one rule;

means for replacing the failed disk with the best spare disk;

in the event that no spare disk meets the at least one rule, means for selecting a spare disk which violates the at least one rule as a selected disk; and means for notifying an administrator that the selected spare disk violates the rule.

3. A file server in a network storage system, comprising:
a storage adapter to connect to a plurality of disk storage units in the network storage system;
an operating system to maintain a plurality of volumes, each volume associated with a set of disk storage units, the set of disk storage units selected from the plurality of disk storage units;
the operating system maintaining a plurality of spare disks units selected from the plurality of disk storage units;
the operating system choosing a best spare disk of the plurality of spare disks to replace a failed disk, the failed disk associated with any volume of the network storage system;
the operating system attempting to determine a best spare disk by selecting those disks from the plurality of spare disks which meet at least one rule;
the operating system replacing the failed disk with the best spare disk;
in the event that no spare disk meets the at least one rule, the operating system selecting a spare disk which violates the at least one rule as a selected disk; and
the operating system notifying an administrator that the selected spare disk violates the rule.

4. A method for allocating a spare disk to replace a failed disk in a network storage system, comprising:
maintaining a plurality of volumes in the network storage system each volume associated with a set of disk storage units;
maintaining a plurality of spare disks in the network storage system;
choosing a best spare disk of the plurality of spare disks to replace a failed disk, the failed disk associated with any volume of the network storage system, wherein the best spare disk is chosen based upon a comparison of the speed of the spare disks and the failed disk; and
replacing the failed disk with the best spare disk.

5. A computer implemented method for allocating a spare storage device to replace a failed storage device in a network storage system, comprising:
identifying a set of spare storage devices in the network storage system; and
selecting a particular spare storage device of the set of spare storage devices to replace the failed storage device, the particular spare storage device selected using a size policy in which preference is given to a spare storage device with minimum storage space in excess of the storage space of the failed disk.

6. A computer implemented method for allocating a spare storage device to replace a failed storage device in a network storage system, comprising:
identifying a set of spare storage devices in the network storage system; and
selecting a best spare storage device of the set of spare storage devices to replace the failed storage device, the best spare storage device selected using a speed policy in which preference is given to a spare storage device with a speed closest to that of the failed disk.

7. The method of claim 6 wherein the speed is a rotation speed.

8. The method of claim 6 wherein the speed is a data read speed.

9. The method of claim 6 wherein the speed is a data write speed.

10. A computer readable medium comprising executable program instructions for allocating a spare storage device to replace a failed storage device in a network storage system, the executable program instructions adapted for:
identifying a set of spare storage devices in the network storage system; and
selecting a particular spare storage device of the set of spare storage devices to replace the failed storage device, the particular spare storage device selected using a size policy in which preference is given to a spare storage device with minimum storage space in excess of the storage space of the failed disk.

11. A computer readable medium comprising executable program instructions for allocating a spare storage device to replace a failed storage device in a network storage system, the executable program instructions adapted for:
identifying a set of spare storage devices in the network storage system; and
selecting a best spare storage device of the set of spare storage devices to replace the failed storage device, the best spare storage device selected using a speed policy in which preference is given to a spare storage device with a speed closest to that of the failed disk.

* * * * *

UNITED STATES PATENT AND TRADEMARK OFFICE
CERTIFICATE OF CORRECTION

PATENT NO. : 7,146,522 B1  
APPLICATION NO. : 10/027013  
DATED : December 5, 2006  
INVENTOR(S) : Alan L. Rowe et al.

It is certified that error appears in the above-identified patent and that said Letters Patent is hereby corrected as shown below:

Please correct Col. 1, line 9 as shown:

SYSTEM AND METHOD ~~FOE~~ FOR TRANSFERRING VOL-

Please correct Col. 1, line 57 as shown:

large number of ~~is~~ discrete volumes (150 or more, for)

Signed and Sealed this

Twenty-fourth Day of August, 2010

David J. Kappos
*Director of the United States Patent and Trademark Office*